United States Patent
Rogan et al.

(10) Patent No.: US 8,379,514 B2
(45) Date of Patent: *Feb. 19, 2013

(54) ROUTE REFLECTOR FOR A COMMUNICATION SYSTEM

(75) Inventors: Michael Rogan, Waterloo (CA); Peter Weiler, Waterloo (CA)

(73) Assignee: Research In Motion Limited, Waterloo, ON (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/185,537

(22) Filed: Jul. 19, 2011

(65) Prior Publication Data

US 2011/0276708 A1    Nov. 10, 2011

Related U.S. Application Data

(63) Continuation of application No. 12/395,355, filed on Feb. 27, 2009, now Pat. No. 8,023,406.

(51) Int. Cl.
G01R 31/08    (2006.01)
H04B 7/00    (2006.01)
H04L 12/28    (2006.01)

(52) U.S. Cl. ......... 370/219; 370/244; 370/310; 370/389

(58) Field of Classification Search .................. None
See application file for complete search history.

(56) References Cited

U.S. PATENT DOCUMENTS 8,023,406 B2 *    9/2011    Rogan et al. ............ 370/219

OTHER PUBLICATIONS

Rogan et al., "A Route Reflector for a Communication System", U.S. App. No. 12/395,355, filed Feb. 27, 2009.

* cited by examiner

Primary Examiner — Kwang B Yao
Assistant Examiner — Jutai Kao
(74) Attorney, Agent, or Firm — Perry + Currier (57) ABSTRACT

A method, system and apparatus for routing of data transmitted from a mobile electronic device to a first host of a plurality of hosts in a communication network using a Border Gateway Protocol (BGP) is provided. It is determined, at a network element having a same address as a first host of a plurality of network hosts, that the first host has failed via receipt of BGP (Border Gateway Protocol) rerouted data, the BGP rerouted data originally transmitted to the first host from a communication device. A negative acknowledgement (NACK), identifiable as having been transmitted by the network element, is transmitted to the communication device to trigger the communication device to transmit data that was to be transmitted to the first host to another of the plurality of network hosts.

16 Claims, 12 Drawing Sheets

ROUTE REFLECTOR FOR A COMMUNICATION SYSTEM

CROSS REFERENCE TO RELATED APPLICATIONS

The present application is a continuation of U.S. patent application Ser. No. 12/395,355 filed on Feb. 27, 2009, which is incorporated herein by reference.

FIELD

The specification relates generally to communication systems, and specifically to a route reflector network element, for a communication system and methods for implementation therein.

BACKGROUND

In some communications networks when there are no routes to a given endpoint (e.g. a host having a given IP address) due to a failure of the endpoint, or the endpoint being offline, an Internet Control Message Protocol (ICMP) message is returned notifying a source (e.g. a communications/computing device) that the endpoint/host is unavailable. However, in a secure environment, ICMP messages are generally disabled to prevent (for example) denial of service attacks on the source. Even if ICMP messages are transmitted, in secure environments ICMP packets are generally filtered by firewalls. Hence the source is unable to determine why the destination is not responding. In some situations the data can be resent, and/or response request packets (pings) can be transmitted, a given number of times before assuming that the destination is unavailable. These extra sends and/or pings in a wireless environment causes additional load on a wireless network, reduces battery life in a mobile electronic device and provides an overall poor experience due to delays in data transmission.

BRIEF DESCRIPTIONS OF THE DRAWINGS

Embodiments are described with reference to the following figures, in which.

DETAILED DESCRIPTION OF THE EMBODIMENTS

An aspect of the specification provides a method comprising: determining, at a network element having a same address as a first host of a plurality of network hosts, that the first host has failed via receipt of BGP (Border Gateway Protocol) rerouted data, the BGP rerouted data originally, transmitted to the first host from a communication device; and transmitting, to the communication device, a negative acknowledgement (NACK) identifiable as having been transmitted by the network element, to trigger the communication device to transmit data that was to be transmitted to the first host to another of the plurality of network hosts.

The NACK can comprise an address of the another of the plurality of network hosts.

The NACK can comprise an indicator triggering selection of the another of the plurality of network hosts from a host routing table (HRT). The indicator can be enabled to trigger random selection of the another of the plurality of network hosts.

The NACK can be identifiable as having been transmitted by the network element via at least one of a security certificate and an encryption key.

The method can further comprise detecting that the communication device is in an idle state and transmitting a second NACK to the communication device, to trigger the communication device to transmit data that was to be transmitted to a second host to yet another of the plurality of network hosts such that maintenance can be performed on the second host.

Data transmitted from the communication device to the plurality of network hosts can be transported via a Unified Datagram Protocol (UDP).

Each of the plurality of network hosts can comprise a respective network element similar to the network element.

Another aspect of the specification provides a network element comprising: a processor and a communication interface, the processor enabled to: determine that a first host of a plurality of network hosts has failed via receipt of BGP (Border Gateway Protocol) rerouted data via the communication interface, the BGP rerouted data originally transmitted to the first host from a communication device, the network element having a same address as the first host; and transmit, to the communication device via the communication interface, a negative acknowledgement (NACK) identifiable as having been transmitted by the network element, to trigger the communication device to transmit data that was to be transmitted to the first host to another of the plurality of network hosts.

The NACK can comprise an address of the another of the plurality of network hosts.

The NACK can comprise an indicator triggering selection of the another of the plurality of network hosts from a host routing table (HRT). The indicator can be enabled to trigger random selection of the another of the plurality of network hosts.

The NACK can be identifiable as having been transmitted by the network element via at least one of a security certificate and an encryption key.

Data transmitted from the communication device to the plurality of network hosts can be transported via a Unified Datagram Protocol (UDP).

Each of the plurality of network hosts can comprise a respective network element similar to the network element.

Another aspect of the specification provides a communication device comprising: a processor and a communication interface, the processor enabled to: receive a negative acknowledgement (NACK) in response to transmission of BGP (Border Gateway Protocol) data originally transmitted to a first host of a plurality of network hosts, the NACK identifiable as having been transmitted by a network element having a same address as the first host; and responsively transmit data that was to be transmitted to the first host to another of the plurality of network hosts.

A further aspect of the specification provides a network element comprising: a processor and a communication interface, the processor enabled to: determine that a communication device is in an idle state; and, responsively transmit, to the communication device via the communication device, a negative acknowledgement (NACK) identifiable as having been transmitted by the network element, to trigger the communication device to transmit data that was to be transmitted to the first host to another of the plurality of network hosts, such that maintenance can be performed on the first host.

The processor can be further enabled to determine that the communication device is in the idle state by monitoring pings from the communication device Yet a further aspect of the specification provides a method comprising: determining at a network element that a communication device is in an idle state; and, transmitting, to the communication device, a negative acknowledgement (NACK) identifiable as having been transmitted by the network element, to trigger the communication device to transmit data that was to be transmitted to the first host to another of the plurality of network hosts, such that maintenance can be performed on the first host.

Determining that the communication device is in the idle state can comprise monitoring pings from the communication device.

Figure 1:
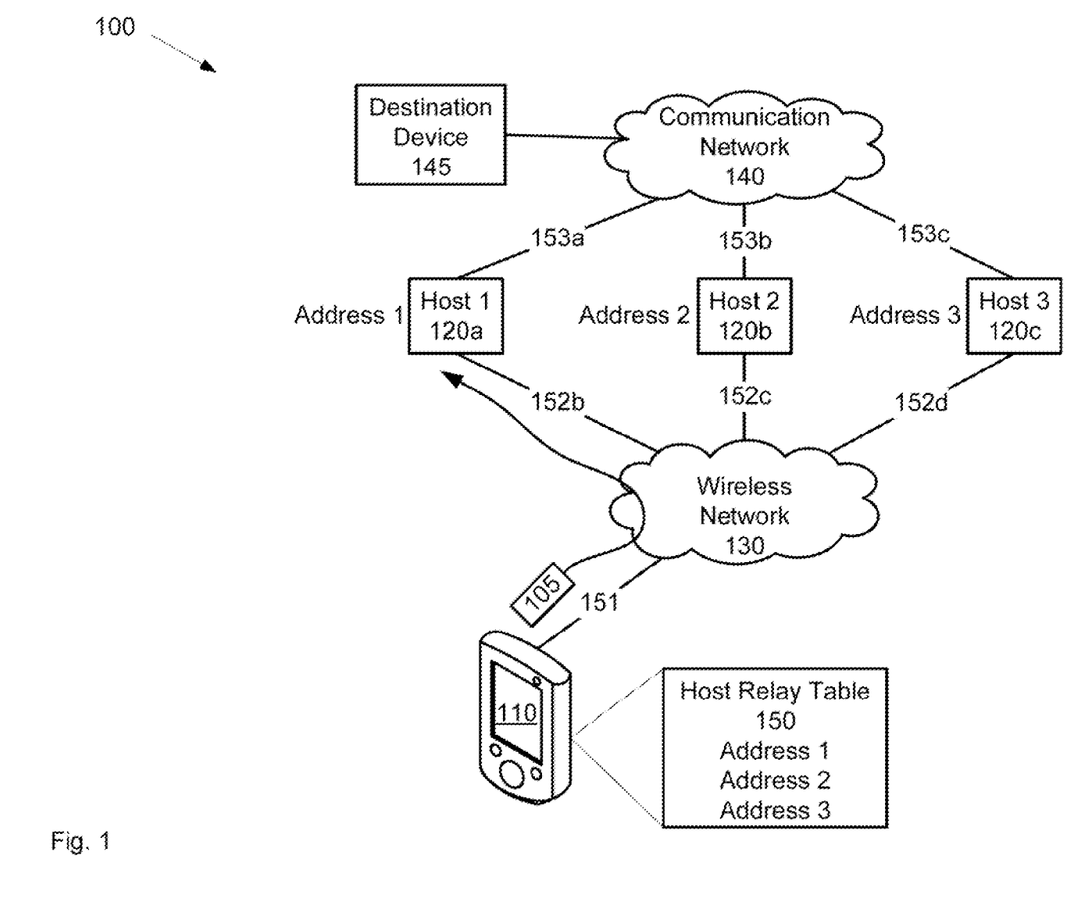
FIG. 1 depicts a system for routing data transmitted from a mobile electronic device to a first host of a plurality of hosts via a wireless network, according to the prior art.

Prior to describing present embodiments, attention is directed to FIG. 1 which depicts a system 100 for routing data 105 transmitted from a mobile electronic device 110 to a first host 120a of a plurality of hosts 120a, 120b, 120c (generically a host 120, and collectively hosts 120) via a wireless network 130. Each host 120 is enabled to relay data 105 transmitted from mobile electronic device 110 to a communication network 140, and hence on to at least one destination device 145, for example when sending e-mail and/or requesting data from websites etc. The network address (Address 1, Address 2, Address 3, respectively for hosts 120a, 120b, 120c) of each host 120 is stored in a host relay table (HRT) 150 at mobile electronic device 110. HRT 150 can be stored in a memory of mobile electronic device 110.

It is further understood that system 100 is not limited to one mobile electronic device 110 and can comprise a plurality of mobile electronic devices (e.g. hundreds and/or thousands of mobile electronic devices), each of these mobile electronic devices transmitting data to hosts 120. Furthermore, it is understood that system 100 is not limited to three hosts 120 and can comprise any suitable number of hosts 120.

It is further understood that hosts 120, wireless network 130, and communication network 140 in combination comprise a communication network for transmitting data 105 from mobile electronic device 110 to destination devices 145.

Mobile electronic device 110 is in communication with wireless network 130 via link 151. Link 151 can include any suitable combination of antennas, relay stations, and the like. Wireless network 130 can be any suitable wireless network including cell phone networks (including capability for transport of both voice and data transmission, as desired), such as CDMA, GPS, 1X, EDGE, UPMS, and the like, WiFi, WiMax and the like. Wireless network 130 is in turn in communication with each host 120 via links 152, which can be wired or wireless as desired. In general, wireless network 130 is enabled to receive data from mobile communication device 110 and relay data to the host 120 identified within the data via an address (e.g. Address 1, Address 2, Address 3).

Each host 120 can be further enabled to then relay data received from mobile communication device 110 to communication network 140 via a suitable link 153, and hence to at least one destination device 145.

In general, system 100 utilizes a Border Gateway Protocol (BGP) environment (an application for routing data in which a table of IP networks is maintained, such as HRT 150, which designate network reachability). Within a BGP environment, each address (e.g. Address 1, Address 2, Address 3) can be associated with a plurality of hosts, similar to hosts 120 and that mobile electronic device 110 and/or network 130 is generally enable to transmit and relay data, similar to data 105, to one of the given hosts sharing a given address based on any suitable algorithm, for example algorithms for load balancing and/or transmitting data via the lowest cost path and/or transmitting data via the most efficient/quickest path, etc. Any other suitable algorithm is within the scope of present embodiments.

Furthermore, within system 100, data is transported using a User Datagram Protocol (UDP). UDP generally uses a simple transmission model without implicit hand-shaking dialogues and hence reliability, ordering, or data integrity is not guaranteed. Hence, if a given host 120a having Address 1 fails, then mobile electronic device 110 and/or wireless communication network 130 will continue to transmit/relay data to the next host having Address 1. If no other host having Address 1 is available (and/or all hosts having Address 1 fail), then data intended for Address 1, transmitted to given host 120a, can result in lost data (e.g. lost packets), until mobile electronic device 110 determines that replies are not being received from host 120a and/or pings to host 120a are not responded to.

In some embodiments, mobile electronic device 110 chooses a random address from HRT 150 to communicate with a given host 120a and will only change to another host associated with the same address (e.g. Address 1) if the given host 120a fails. Again, however, detection of the failure of the given host 120a can involve lost data/packets over a time period before choosing another host. Furthermore, as system 100 comprises a plurality of mobile electronic devices, failure of host 120a can result in one of the remaining hosts associated with the Address 1 being overwhelmed with data transmissions if a large portion of the data originally intended for host 120a is not transmitted to one of the remaining hosts. This can also result in failure of a host and possible failure of system 100.

Figure 2:
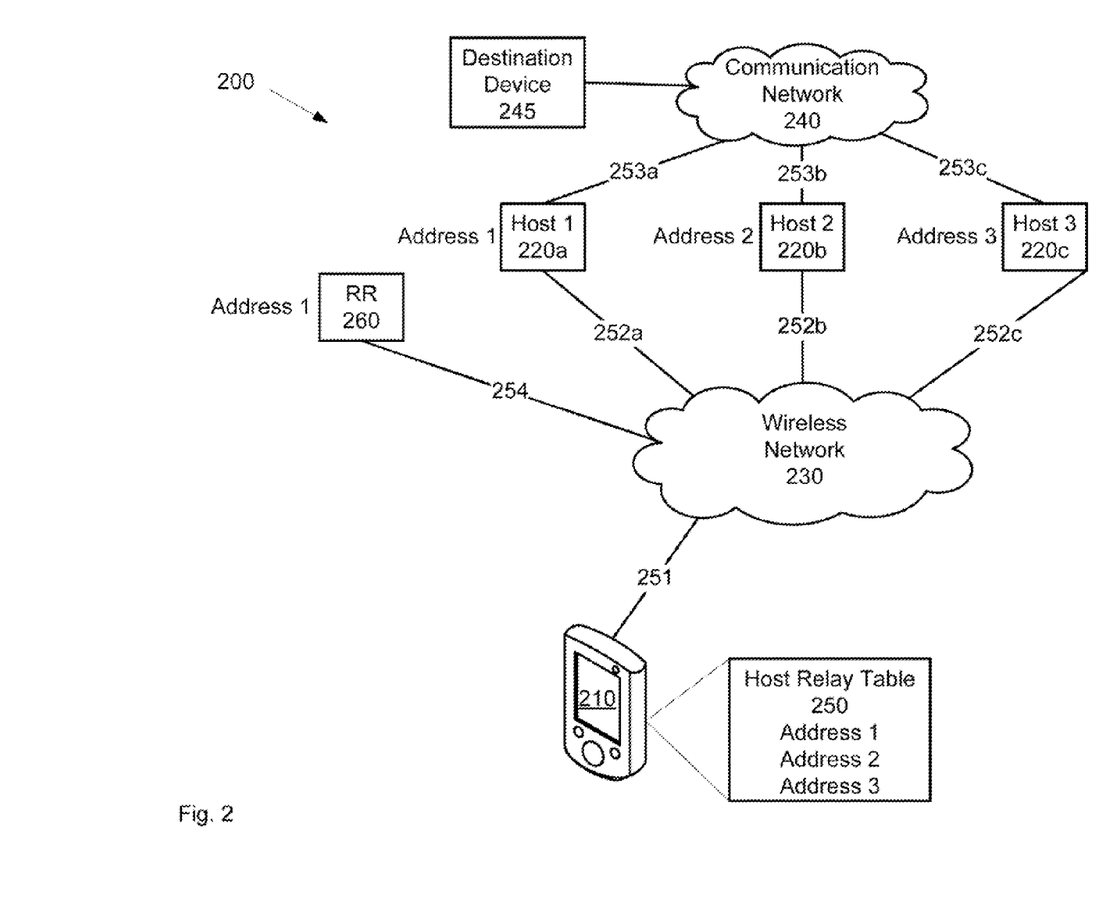
FIG. 2 depicts a system for changing routing of data transmitted from a mobile electronic device to a first host of a plurality of hosts via a wireless network, according to non-limiting embodiments.
Figure 10:
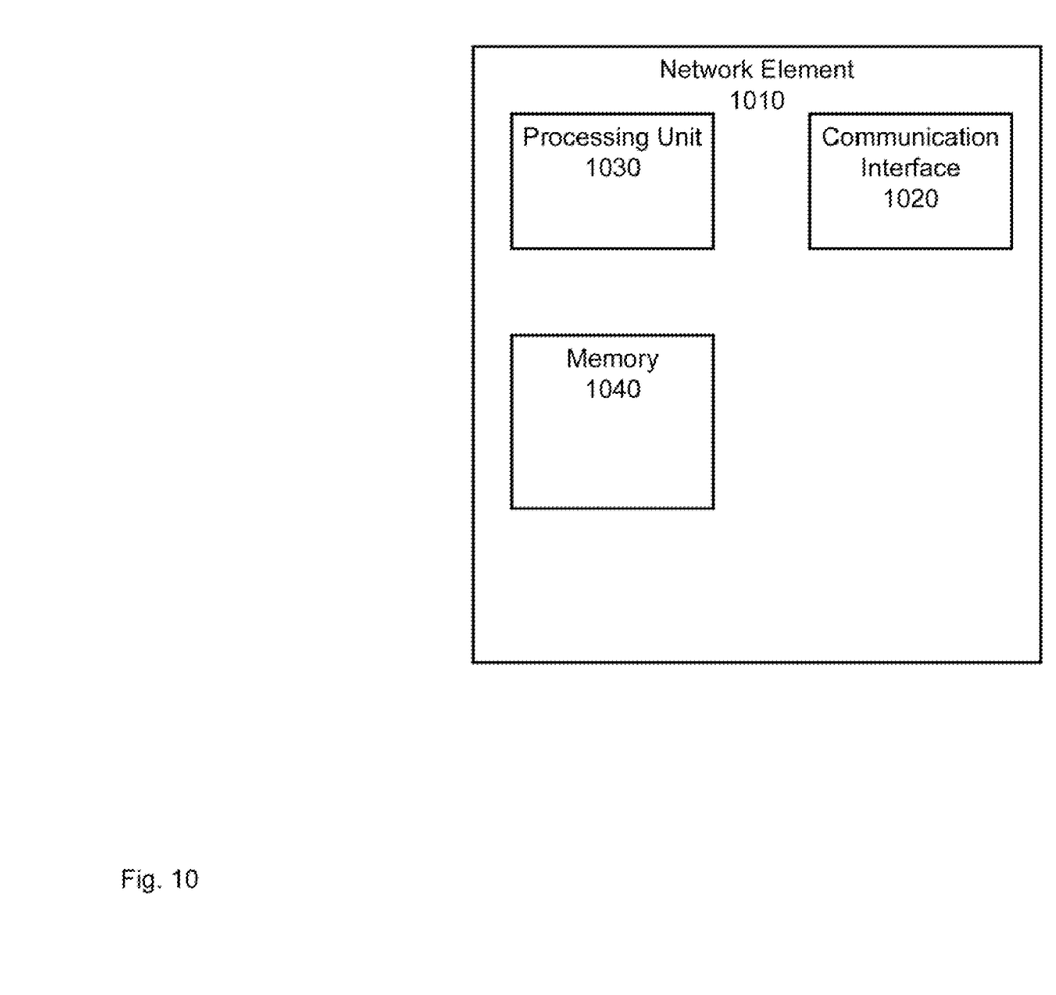
FIG. 10 depicts a network element for changing routing of data transmitted from a mobile electronic device to a first host of a plurality of hosts via a wireless network, according to non-limiting embodiments.

In any event, attention is now directed to FIG. 2, which depicts a system 200 for changing routing of data transmitted from a mobile electronic device 210 to a first host 220a of a plurality of hosts 220 in a communication network using a Border Gateway Protocol (BGP). The architecture of system 200 is similar to that of system 100, with similar elements having similar numbers, but beginning with a "2" instead of a "1". For example, mobile electronic device 210 is similar to mobile electronic device 110. However, system 200 further comprises a network element which is referred to herein as a route reflector 260. Route reflector 260 can comprise a network element 1010 as depicted in FIG. 10, described below.

Route reflector 260 can be located at any suitable point in system 200. As depicted, route reflector 260 is an element connected to wireless network 230 via link 254. Furthermore, route reflector 260 has the same network address (e.g. Address 1) as a given host 220a for which data is to be rerouted in the event of failure of the given host 220a. In addition, similar to system 100, system 200 utilizes a BGP environment. Within the BGP environment, link 254 is configured to be used in the event that link 252a is down (e.g. if host 220a fails). For example, link 253 can be configured to have a higher cost than link 252a. In general, in the BGP environment, wireless network 230 determines if host 220a is unavailable (including if host 220a and/or link 252a goes down), and subsequently re-routes data 405 to route reflector 260. In some embodiments, route reflector 260 generally comprises a table (or the like) of the addresses of each of the plurality of hosts 220.

In particular, route reflector 260 is enabled to determine whether first host 220a has failed via receipt of BGP rerouted data, the BGP rerouted data originally intended for the first host 220a. Indeed, any packets arriving at route reflector 260 are used to determine that a failure has occurred. Once the route reflector 260 has determined that a failure of at least one host 220 has occurred, the route reflector 160 responsively transmits a negative acknowledgement (NACK) to mobile electronic device 210, for example via link 254. NACK is generally enabled to trigger mobile electronic device 210 to transmit data that was to be transmitted to the host 220 that failed to another of the plurality of hosts 220. In general, the generic NACK is modified to include such a trigger. Various embodiments of such a trigger are now described.

For example, in embodiments where route reflector 260 comprises a table (or the like) of the addresses of each of the plurality of hosts 220, NACK comprises an address of another of the plurality of hosts 220. Once mobile electronic device 210 receives NACK comprising the address of the another of the plurality of hosts 220, data that was to be transmitted to host 220 that failed is then transmitted to the address of the another of the plurality of hosts 220. In a specific non limiting example, if route reflector 260 determines that host 220a has failed, then route reflector 260 can send NACK to mobile electronic device 210, NACK comprising the address (Address 2) of host 220b. Mobile electronic device 210 then routes all data originally intended for host 220a to host 220b. In these embodiments, HRT 250 at device 210 can be updated to remove Address 1 and/or replace Address 1 with Address 2.

Route reflector 260 can use any suitable method for determining which of the another of the plurality of hosts 220 mobile electronic device 210 is to send data. For example, in some embodiments, the other of the plurality of hosts 220 can be randomly selected.

In other embodiments, the other of the plurality of hosts 220 can be selected based on load balancing: for example, system 200 can comprise a plurality of mobile electronic devices, including mobile electronic device 210, and if host 220a fails, a NACK can be transmitted to each of the plurality of mobile electronic devices, each NACK comprising the address of another of the plurality of hosts 220. However, each NACK can comprise the same or different address as desired. For example, data from a first subset of the plurality of mobile electronic devices can be redirected to host 220b if host 220a fails, while data from a second subset of the plurality of mobile electronic devices can be redirected to host 220c. In this manner, the load of data originally intended to be transmitted to host 220a is shared between the remaining hosts.

In other embodiments, the other of the plurality of hosts 220 can be selected based on policy rules. For example, in some of these embodiments, host 220b can be located on a less expensive path than host 220c, and policy rules can dictate that the lowest cost path is to be used. In other embodiments, host 220b can be located on a more efficient/quicker path than host 220c, and policy rules can dictate that the more efficient/quicker path is to be used. Choice of host 220 can also be based on the identifier of mobile electronic device 210 in combination with policy rules: for example, mobile electronic device 210 can be associated with a user who has a high priority within on organization and policy rules can dictate that data originating from mobile electronic device 210 associated with such as user is to be routed as efficiently as possible, regardless of cost.

In other embodiments, NACK is generally enabled to trigger mobile electronic device 210 to transmit data that was to be transmitted to the host 220 that failed to another of the plurality of hosts 220 by including an indicator for instructing mobile electronic device 210 to select another of the plurality of hosts 220 from host routing table (HRT) 250 stored at mobile electronic device 220. Any suitable method can be used to select another of said plurality of hosts 220 from HRT 250. For example, in some embodiments, the indicator is for instructing mobile electronic device 210 to randomly select another of the plurality of hosts 220 from the routing table. In other embodiments, policy rules can be applied as described above, the policy rules stored and implemented at mobile electronic device 210. In further embodiments, HRT 250 can include an indication of cost and/or efficiency of transmitting data to each of host 220 and selection of host 220 can be based on the cost and/or efficiency as described above. In any event, the another of the plurality of hosts 220 can be selected so to balance the load on the remaining hosts 220.

Furthermore, NACK is identifiable by mobile electronic device 220 as having been transmitted by route reflector 260. For example, NACK can be encrypted using any suitable encryption key, such as a private/public key system (e.g. NACK is encrypted at route reflector 260 using a private key, and decrypted using a complimentary public key at mobile electronic device 210: distribution/updating of keys can occur using any suitable method, for example during a key provisioning process). Alternatively, NACK can be signed using a suitable security certificate, which identifies NACK as having originated at route reflector 260.

In any event, as NACK is identifiable by mobile electronic device 220 as having been transmitted by route reflector 260, third parties are prevented from launching a denial of service or man in the middle attack on mobile electronic device 210.

Attention is now directed to FIG. 10, which depicts nonlimiting embodiments of network element 1010. Route reflector 260 can comprise network element 1010. Network element 1010 comprises a communication interface 1020 which is generally enabled to determine if at least first host 220a of the plurality of hosts 220 has failed via receipt of BGP rerouted data, the BGP rerouted data originally intended for the first host 220a, as described below. If it is determined that a failure in the at least first host 220a has occurred, then communication interface 1020 transmits a negative acknowledgement (NACK) to mobile electronic device 210. NACK is enabled to trigger mobile electronic device 210 to transmit data that was to be transmitted to first host 220*a* to another of the plurality of hosts 220 and wherein NACK is identifiable by mobile electronic device 210 as having been transmitted by network element 1010, as described above.

Network element 1010 further comprises a processing unit 1030 in communication with communication interface 1020. Processing unit 1030 is enabled to determine if a failure occurs in first host 220*a*, for example via communication interface 1020, as described below with reference to route reflector 260. Processing unit 1030 is further enabled to generate NACK. Processing unit 1030 can be further enabled to encrypt NACK using any suitable encryption key and/or sign NACK using any suitable digital certificate such that NACK is identifiable by mobile electronic device 210 as having been transmitted by network element 1010.

In some embodiments, network element 1010 further comprises a memory 1040 for storing identifiers of hosts 220 (e.g. network addresses) and/or an identifier of mobile electronic device 210. In other embodiments, such identifiers can be stored at a remote database accessible to network element 1010 via any suitable network including but not limited to wireless network 230 and/or communication network 240. Memory 1040 can comprise any suitable combination of volatile and non-volatile memory.

In general, communication interface 1020, processing unit 1030 and memory 1040 (if present) are in communication via a computer bus.

Figure 11:
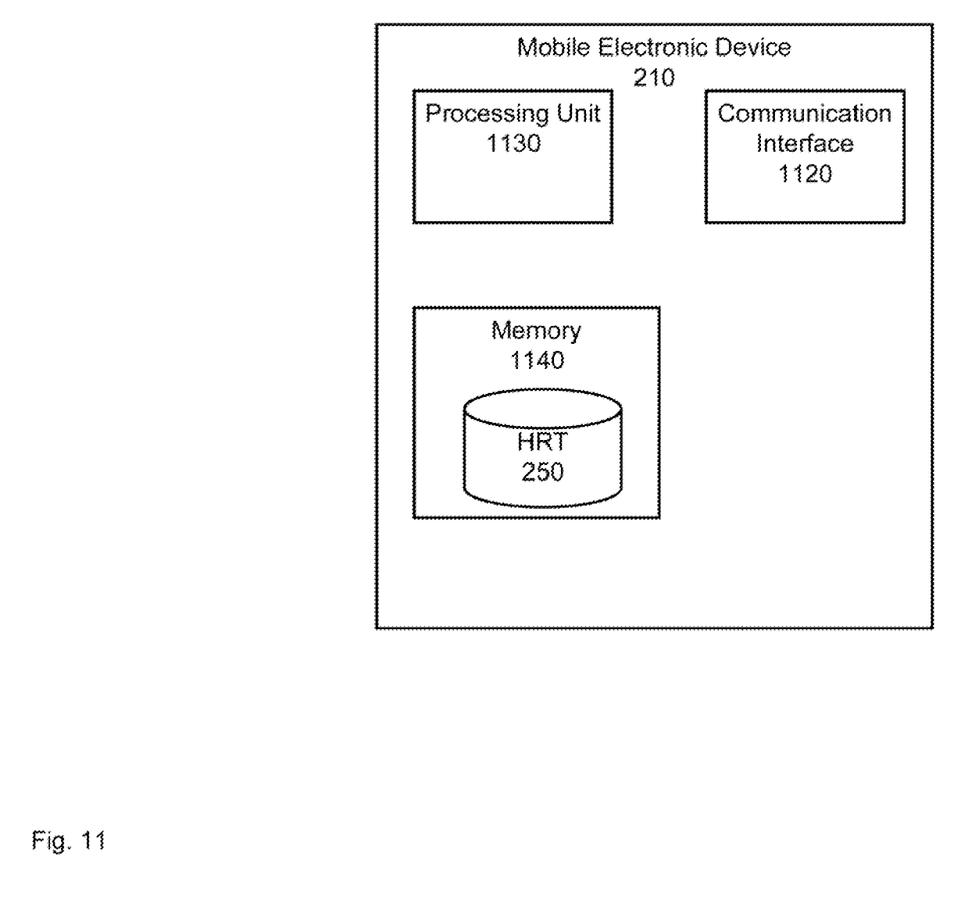
FIG. 11 depicts a mobile electronic device for changing routing of data transmitted from a mobile electronic device to a first host of a plurality of hosts via a wireless network, according to non-limiting embodiments.

Attention is now directed to FIG. 11, which depicts non-limiting embodiments of mobile electronic device 210 for changing routing of data transmitted from mobile electronic device 210 to a first host 220*a* of the plurality of hosts 220 in a communication network (e.g. system 200) using a Border Gateway Protocol (BGP). Mobile electronic device 210 comprises a communication interface 1130 enabled to receive a negative acknowledgement (NACK) from a network element (e.g. network element 1010 and/or route reflector 260) enabled to determine that first host 220*a* has failed via receipt of BGP rerouted data, BGP rerouted data originally intended for first host 220*a*. NACK is generally enabled to trigger mobile electronic device 210 to transmit data that was to be transmitted to first host 220*a* to another of the plurality of hosts 220. Furthermore, as described above, NACK is identifiable by mobile electronic device 210 as having been transmitted by network element (and/or route reflector 260).

Communication interface 1120 is also generally enabled to communicate with hosts 220 via wireless network 230.

Mobile electronic device 210 further comprises a processing unit 1130 in communication with communication interface 1120. Processing unit 1130 is enabled to process NACK transmitted by network element 1010 (and/or route reflector 260), and in response cause data that was to be transmitted to first host 220*a* to another of the plurality of hosts 220.

In some embodiments, mobile electronic device 210 further comprises a memory 1140 for HRT 250. Memory 1140 can comprise any suitable combination of volatile and non-volatile memory.

In general, communication interface 1120, processing unit 1130 and memory 1140 (if present) are in communication via a computer bus (not depicted).

Figure 3:
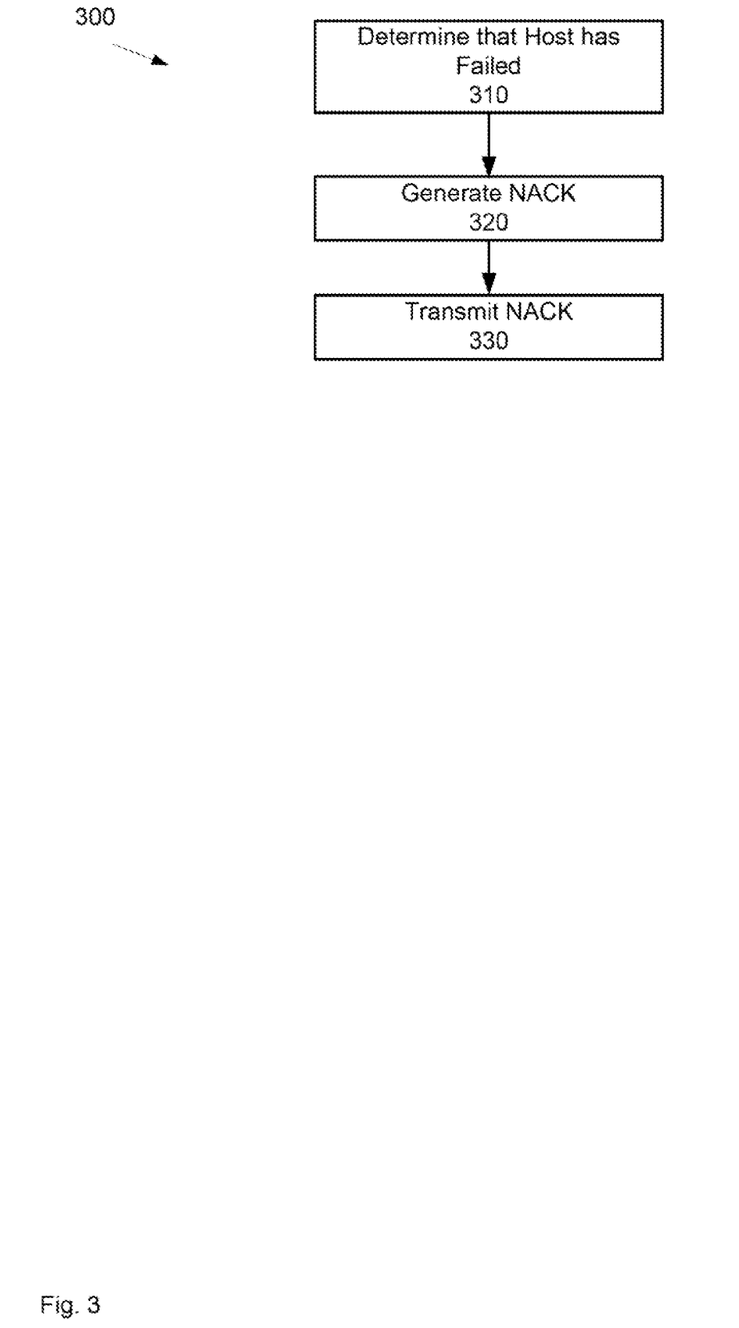
FIG. 3 depicts a method for changing routing of data transmitted from a mobile electronic device to a first host of a plurality of hosts via a wireless network, according to non-limiting embodiments.

Attention is now directed to FIG. 3 which depicts a method 300 for changing routing of data transmitted from a mobile electronic device to a plurality of hosts in a communication network using a Border Gateway Protocol (BGP), method 300 implementable in at least one network element. In order to assist in the explanation of the method 300, it will be assumed that the method 300 is performed using the system 200. Specifically, it is assumed that method 300 is performed using route reflector 260. Furthermore, the following discussion of the method 300 will lead to a further understanding of the system 200 and its various components. However, it is to be understood that the system 200 and/or the method 300 can be varied, and need not work exactly as discussed herein in conjunction with each other, and that such variations are within the scope of present embodiments.

Figure 4:
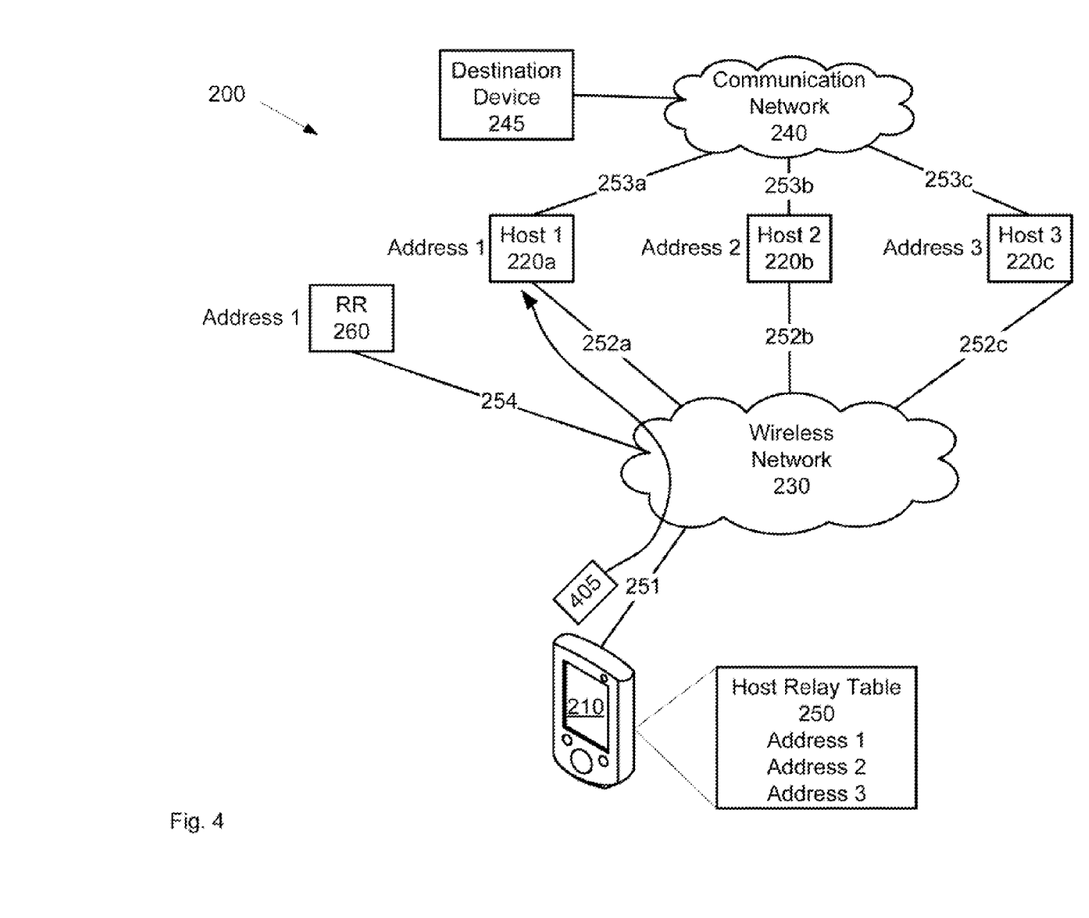
FIGS. 4-6 depict the system of FIG. 2, in various modes of operation, according to non-limiting embodiments.

At step 310, it is determined that first host 220*a* has failed via receipt of BGP rerouted data 405 (see FIG. 4), BGP rerouted data 405 originally intended for first host 220*a*. For example, as depicted in FIG. 4, data 405 is originally intended for first host 220*a*. However, as depicted in FIG. 5, if first host 220*a* fails, then data 405 is rerouted via BGP to route reflector 260, as route reflector 260 has the same address as first host 220*a*, though link 254 is, for example, of a higher cost.

Figure 5:
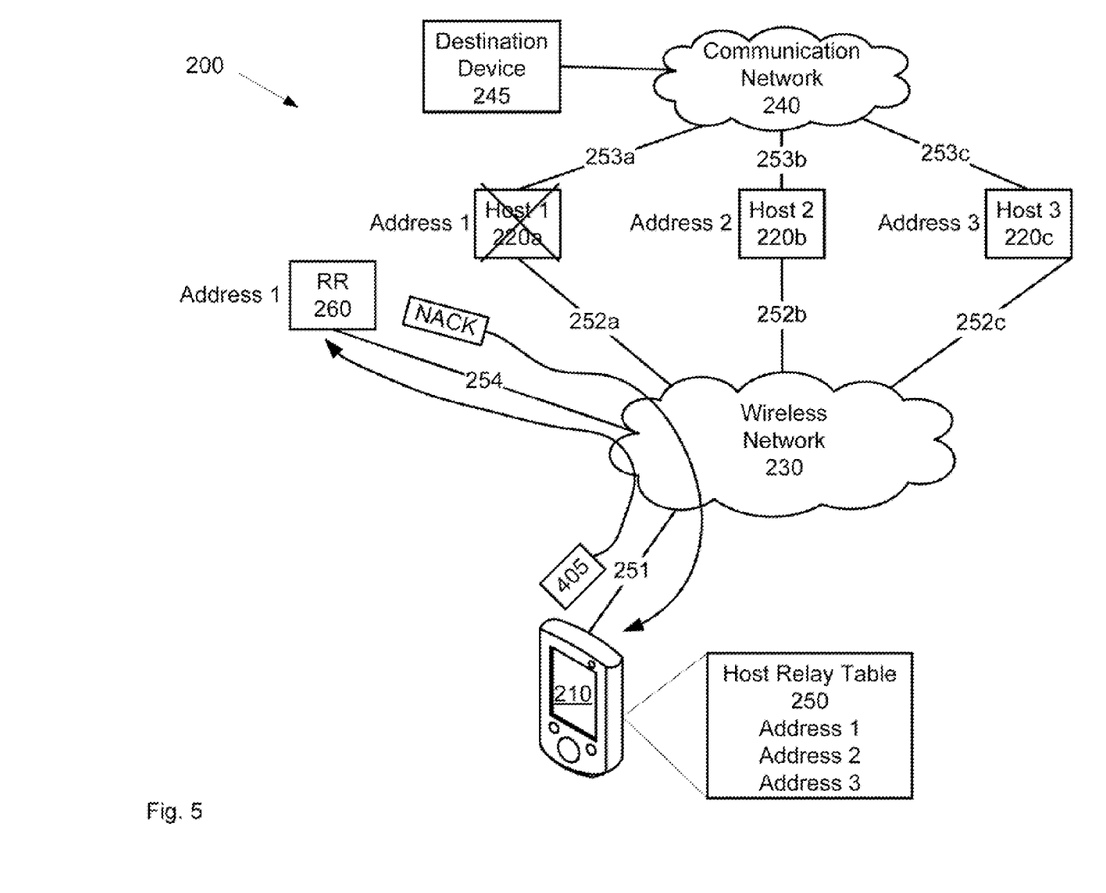

Once it is determined that a failure of host 220*a* has occurred (as depicted in FIG. 5), at step 320 NACK is generated at route reflector 260 NACK is enabled to trigger mobile electronic device 210 to transmit data that was to be transmitted to first host 220*a* to another of the plurality of hosts 220. Furthermore NACK is identifiable by mobile electronic device 210 as having been transmitted by route reflector 260 via any suitable method including but limited to encrypting NACK and/or signing NACK using a security certificate, as described above.

At step 330, NACK is transmitted to mobile electronic device 210, for example via link 254, as depicted in FIG. 5. As described above, in some embodiments, NACK comprises an address of another of the plurality of hosts 220, for example the address of host 220*b*. In other embodiments, NACK comprises an indicator for instructing mobile electronic device 210 to select another of the plurality of hosts 220 from HRT 250 stored at mobile electronic device 210.

Figure 6:
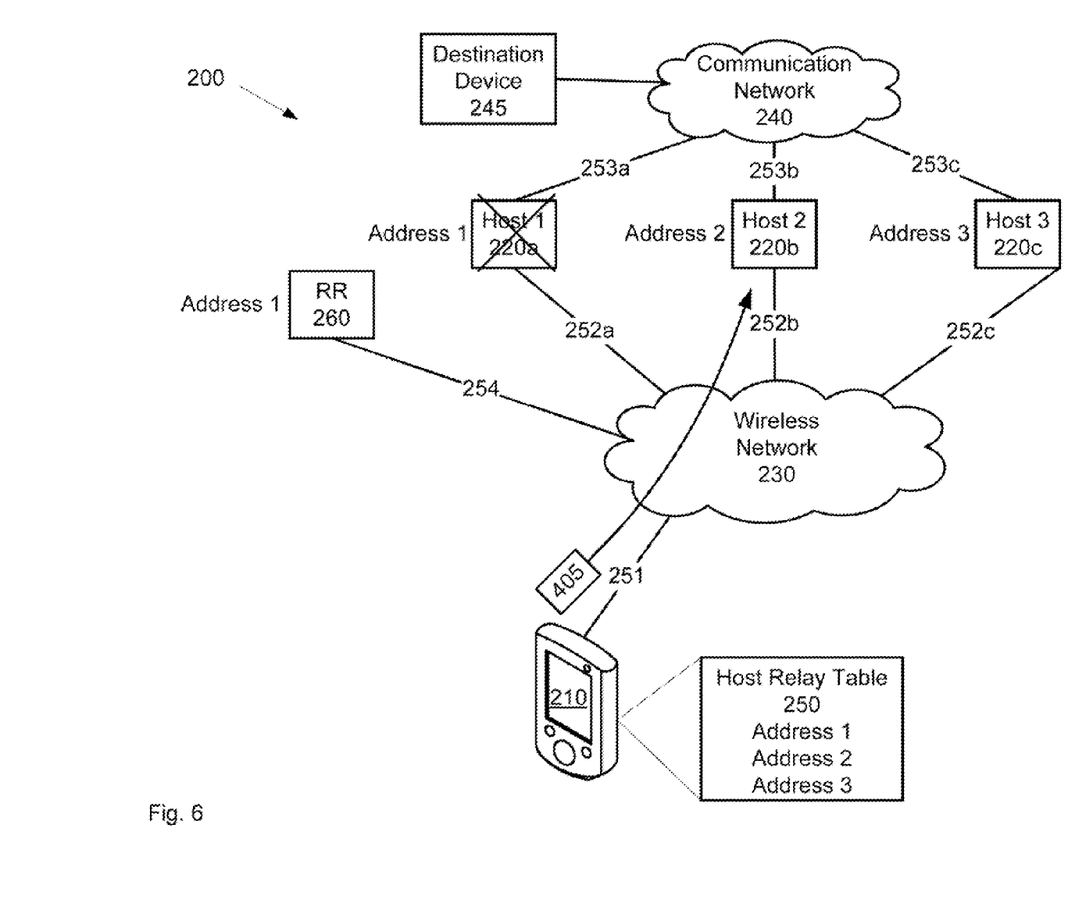

Once NACK is received at mobile electronic device 210, data 405 intended for transmission to host 220*a* is then transmitted to host 220*b* (or another suitable host 220 as determined at route reflector 260 and/or mobile electronic device 210, as described above) as depicted in FIG. 6.

Furthermore, as it is understood that in some embodiments system 200 comprises a plurality of mobile electronic devices, similar to mobile electronic device 210, in these embodiments NACK is sent to each of the plurality of mobile electronic devices at step 330 such that data intended for transmission to host 220*a* at each of the plurality of mobile electronic devices is then transmitted to another of hosts 220, as described above.

Figure 12:
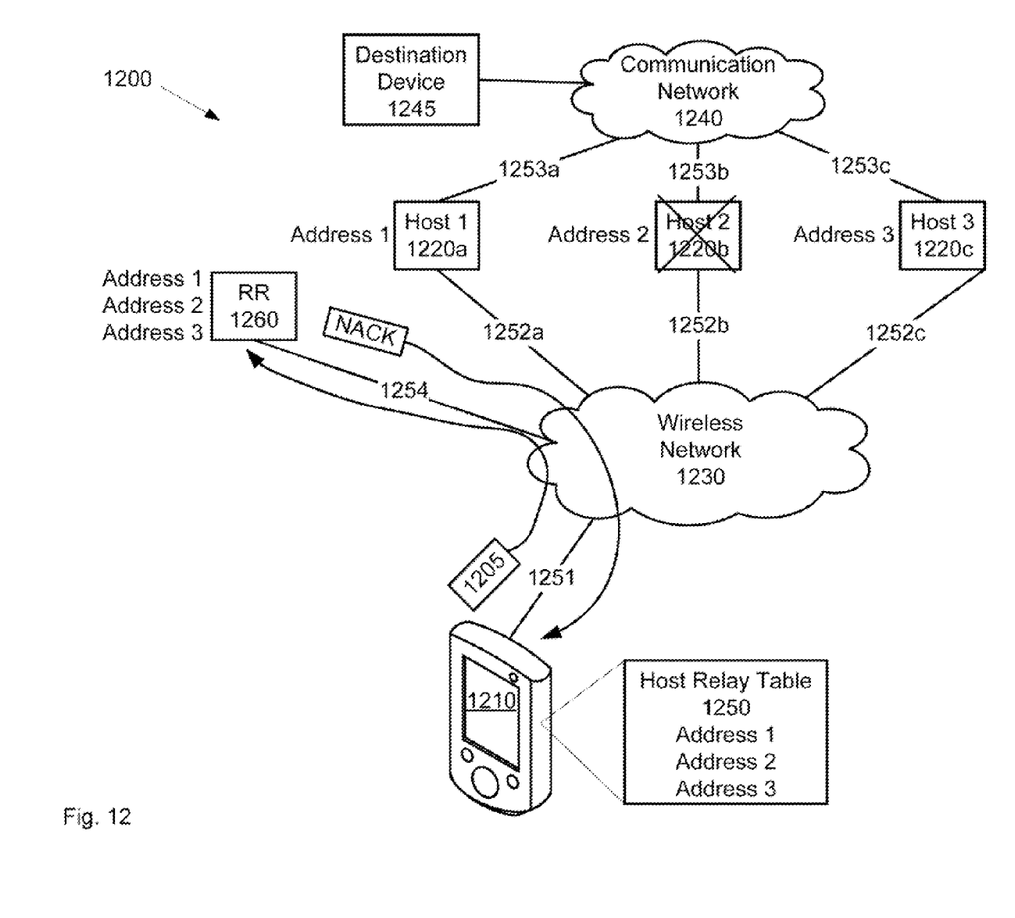
FIG. 12 depicts a system for changing routing of data transmitted from a mobile electronic device to a first host of a plurality of hosts via a wireless network, according to non-limiting embodiments.

It is furthermore understood that system 200 can comprise a plurality of route reflectors 260 in a one-to-one relationship with hosts 220, with each given route reflector having the same address as an associated host 220. However, in other embodiments, as depicted in FIG. 12, a system 1200 (similar to system 200, with similar elements having similar numbers, but preceded by a "12" rather than a "2": for example, device 1210 is similar to device 210) comprises a single route reflector 1260 which has multiple network addresses, Address 1, Address 2, Address 3, each one of the addresses similar to an address of each host 220. In these embodiments, route reflector 1260 is enabled to determine if any of hosts 220 fail by receiving BGP rerouted data 1205 from device 1210, BGP rerouted data 1205 originally intended for one of hosts 220. In these embodiments, BGP rerouted data 1205 comprises the address of the given host 220 for which the data 1205 was originally intended such that route reflector 260 can determined which host 220 has failed.

Figure 7:
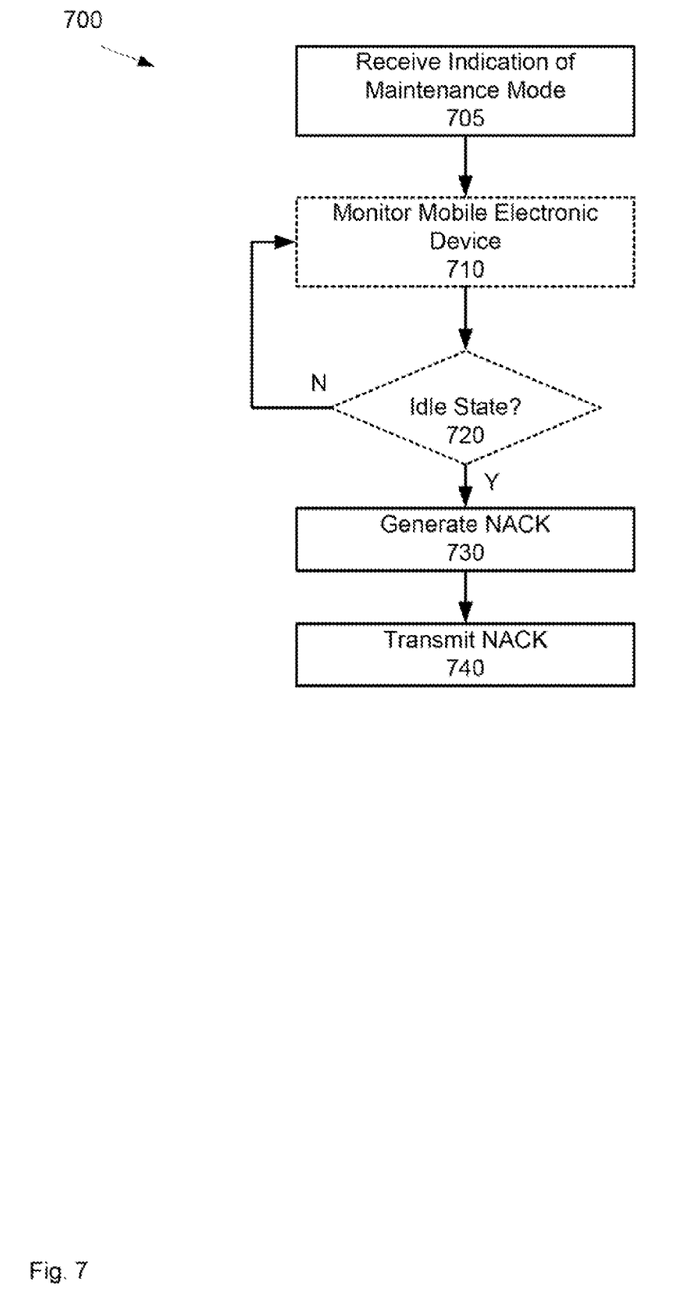
FIG. 7 depicts a method for changing routing of data transmitted from a mobile electronic device to a first host of a plurality of hosts via a wireless network, in a maintenance mode, according to non-limiting embodiments.
Figure 8:
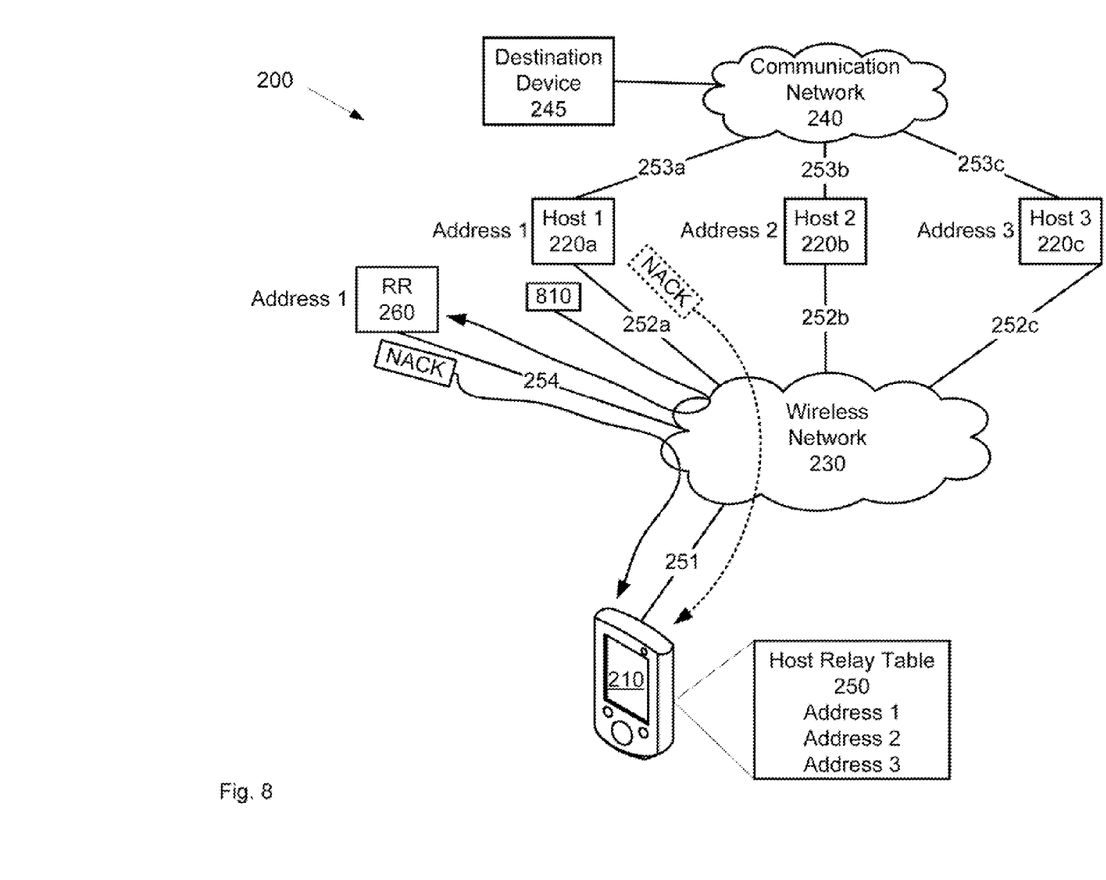
FIG. 8 depicts the system of FIG. 2, in a maintenance mode, according to non-limiting embodiments.

Attention is now directed to FIG. 7 which depicts an alternative method 700 that can be performed in conjunction (before, during, or after, as desired) with method 300, and implementable in system 200. In some embodiments, method 700 can be implemented in route reflector 260. In other embodiments, method 700 can be implemented in a host 220. Embodiments in which method 700 are implemented in route reflector 260 are first described. At step 705, route reflector 260 receives an indication 810 that maintenance is to be performed on a particular host 220, as depicted in FIG. 8. In the depicted embodiments, indication 810 can be transmitted from a given host 220 (e.g. host 220a) to route reflector 260, via links 252a and 254. Transmission of indication 810 can be triggered by an administrator of system 200 and/or automatically and/or periodically, when maintenance is to be performed on a host 220. Alternatively, indication 810 can be generated and transmitted to route reflector 260 by an administrative computing device (not depicted), in communication with route reflector 260.

In some embodiments, once indication 810 is received at route reflector 260, route reflector 260 monitors mobile electronic device 210 at step 710 to determine when mobile electronic device 210 is in an idle state. Such a determination can be made by monitoring pings from mobile electronic device 210 which indicate that mobile electronic device 210 is in an idle state. If step 710 is performed, once it is determined at step 720 that mobile electronic device 210 is in an idle state, at step 720 NACK is again generated and transmitted at step 730, similar to steps 320 and 330, respectively, of method 300, such that data that was to be transmitted to first host 220a is transmitted to another of the plurality of hosts 220.

Furthermore, as it is understood that in some embodiments system 200 comprises a plurality of mobile electronic devices, similar to mobile electronic device 210, a NACK is sent to each of the plurality of mobile electronic devices at step 740, such that data intended to transmission to host 220a at each of the plurality of mobile electronic devices is then transmitted to another of hosts 220, as described above. In any event, once data is from first host 220a to other hosts 220, maintenance can be performed on first host 220a in the absence of data transmissions between first host 220a and mobile electronic device 210.

In other non-limiting embodiments, method 700 can be implemented in a host 220, host 220 enabled to transmit NACK, for example as also depicted in FIG. 8. In these embodiments, step 207 comprises receiving at host 220 an indication that maintenance is to be performed on host 220, for example from a computing device associated with an administrator of system 200 and/or via an input device associated with host 220.

Figure 9:
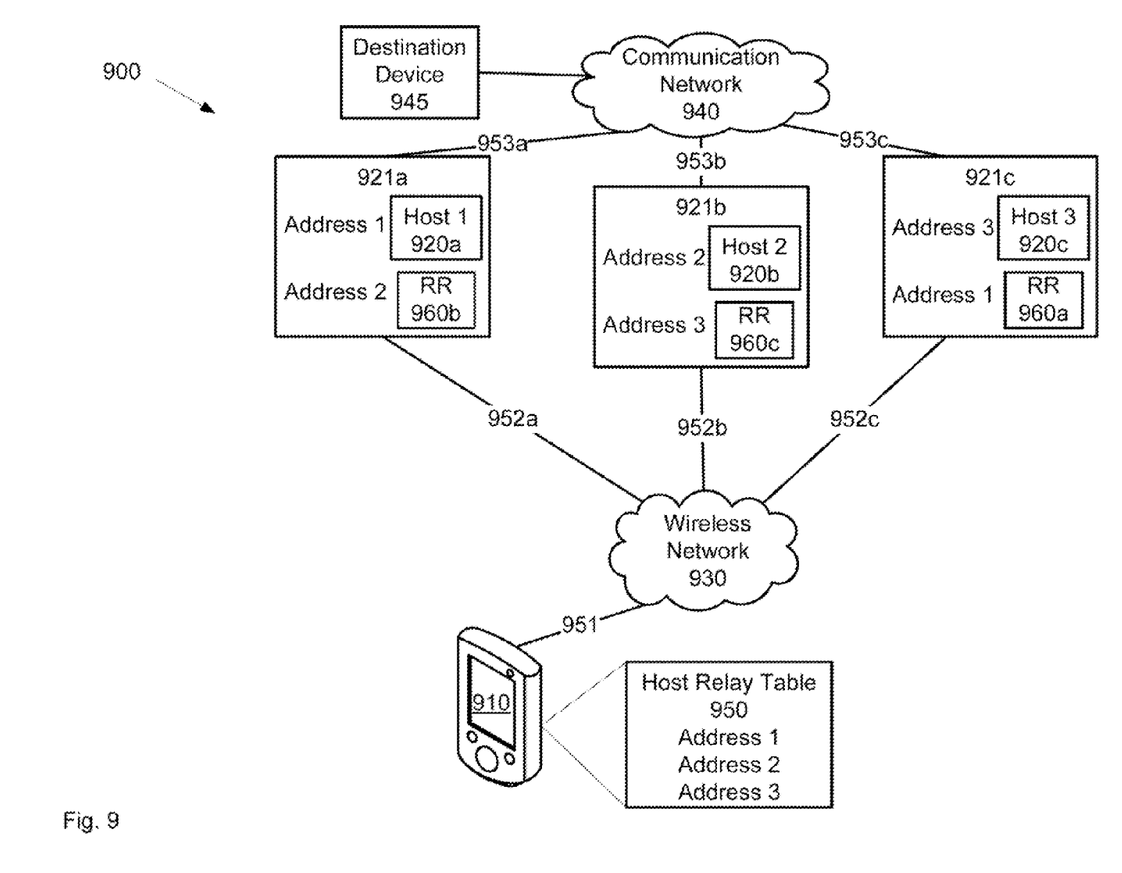
FIG. 9 depicts a system for changing routing of data transmitted from a mobile electronic device to a first host of a plurality of hosts via a wireless network, according to non-limiting embodiments.

Attention is now directed to FIG. 9, which depicts non-limiting alternative embodiments of a system 900 for routing data transmitted from a mobile electronic device 910 to a plurality of hosts 920a, 920b, 920c (generically a host 920, and collectively hosts 120) via a wireless network 930. Elements of system 900 are similar to elements of system 200, except preceded by a "9" rather than a "2". For example, mobile electronic device 910 is similar to mobile electronic device 210. Furthermore, each host 920a, 920b, 920c is located at a respective site 921a, 921b, 921c (generically a site 921, and collectively sites 921). Each host 921 has a respective address, Address 1, Address 2, Address 3, similar to hosts 221 in system 200. Each respective site 921 can be associated with the same respective address.

In system 900, each site 921 comprises a respective route reflector 960 (each labelled "RR" in FIG. 9) similar to route reflector 260, however enabled to determine if a host 920 at another site 921 has failed via receipt of BGP rerouted data, BGP rerouted data originally intended for the host 920 at the other site 921. For example, route reflector 960b, located at site 921a, is enabled to determine if host 920b has failed, route reflector 960c, located at site 921b, is enabled to determine if host 920c has failed, and route reflector 960a, located at site 921c, is enabled to determine if host 920a has failed. Hence, each site 921 is further associated with the address of a host 920 located at another site 921. For example, site 921a is further associated with Address 2 such that data originally intended for host 920b is rerouted to route reflector 960b if host 920b fails, as described above.

Further, each route reflector 960 is in communication with mobile electronic device 910 via links 952 and/or other links, and wireless network 930, such that a respective NACK can be transmitted to mobile electronic device 910 from each respective route reflector 960. Each respective NACK is similar to NACK described in reference to FIGS. 2 through 6.

In some embodiments, each route reflector 960 can be enabled to transmit a NACK to mobile electronic device 910 which triggers mobile electronic device 910 to transmit data that was to be transmitted to the respective host 920 to a specific other host 920 of the plurality of hosts 920. For example, in some embodiments: route reflector 960a can be enabled to transmit a NACK to mobile electronic device 910 which triggers mobile electronic device 910 to transmit data that was to be transmitted to the respective host 920a to host 920b (or any other suitable host 920); route reflector 960b can be enabled to transmit a NACK to mobile electronic device 910 which triggers mobile electronic device 910 to transmit data that was to be transmitted to the respective host 920b to host 920c (or any other suitable host 920); and route reflector 960c can be enabled to transmit a NACK to mobile electronic device 910 which triggers mobile electronic device 910 to transmit data that was to be transmitted to the respective host 920c to host 920a (or any other suitable host 920).

In any event, the presence of at least one route reflector 260, 960 in a communication system operating in a BGP environment generally prevents data/packets from being lost in the communication system as data is prevented from being sent to a failed host, which receives and forwards data tram mobile electronic devices. Each route reflector 260, 920 is enabled to determine if a host has failed via receipt of BGP rerouted data, the BGP rerouted data originally intended for the host, and further enabled to transmit a NACK to the mobile electronic devices for rerouting data in the event of a failure by one or more the hosts. Furthermore, resources at the mobile electronic devices are used more efficiently as there is no need for them to determine is a host is has failed and/or is not responding. This can conserve battery life of the mobile electronic device as extra sends and/or pings are no longer required to determine if a host has failed. This further reduces load on a wireless network and provides an overall better experience due to fewer delays in data transmission.

Those skilled in the art will appreciate that in some embodiments, the functionality of mobile electronic devices 210, 910, hosts 220, 920, route reflectors 260, 960 and network element 1010 can be implemented using pre-programmed hardware or firmware elements (e.g., application specific integrated circuits (ASICs), electrically erasable programmable read-only memories (EEPROMs), etc.), or other related components. In other embodiments, the functionality of mobile electronic devices 210, 910, hosts 220, 920, route reflectors 260, 960 and network element 1010 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method comprising:
    determining, at a network element having a same address as a first host of a plurality of network hosts, that the first host has failed via receipt of BGP (Border Gateway Protocol) rerouted data, the BGP rerouted data originally transmitted to the first host from a communication device; and
    transmitting, to the communication device, a negative acknowledgement (NACK) identifiable as having been transmitted by the network element, to trigger the communication device to transmit data that was to be transmitted to the first host to another of the plurality of network hosts.

2. The method of claim 1, wherein the NACK comprises an address of the another of the plurality of network hosts.

3. The method of claim 1, wherein the NACK comprises an indicator triggering selection of the another of the plurality of network hosts from a host routing table (HRT).

4. The method of claim 3, wherein the indicator is enabled to trigger random selection of the another of the plurality of network hosts.

5. The method of claim 1, wherein the NACK is identifiable as having been transmitted by the network element via at least one of a security certificate and an encryption key.

6. The method of claim 1, further comprising detecting that the communication device is in an idle state and transmitting a second NACK to the communication device, to trigger the communication device to transmit data that was to be transmitted to a second host to yet another of the plurality of network hosts such that maintenance can be performed on the second host.

7. The method of claim 1, wherein data transmitted from the communication device to the plurality of network hosts is transported via a Unified Datagram Protocol (UDP).

8. The method of claim 1, wherein each of the plurality of network hosts comprises a respective network element similar to the network element.

9. A network element comprising:
    a processor and a communication interface, the processor enabled to:
        determine that a first host of a plurality of network hosts has failed via receipt of BGP (Border Gateway Protocol) rerouted data via the communication interface, the BGP rerouted data originally transmitted to the first host from a communication device, the network element having a same address as the first host; and
        transmit, to the communication device via the communication interface, a negative acknowledgement (NACK) identifiable as having been transmitted by the network element, to trigger the communication device to transmit data that was to be transmitted to the first host to another of the plurality of network hosts.

10. The network element of claim 9, wherein the NACK comprises an address of the another of the plurality of network hosts.

11. The network element of claim 9, wherein the NACK comprises an indicator triggering selection of the another of the plurality of network hosts from a host routing table (HRT).

12. The network element of claim 11, wherein the indicator is enabled to trigger random selection of the another of the plurality of network hosts.

13. The network element of claim 9, wherein the NACK is identifiable as having been transmitted by the network element via at least one of a security certificate and an encryption key.

14. The network element of claim 9, wherein data transmitted from the communication device to the plurality of network hosts is transported via a Unified Datagram Protocol (UDP).

15. The network element of claim 9, wherein each of the plurality of network hosts comprises a respective network element similar to the network element.

16. A communication device comprising:
    a processor and a communication interface, the processor enabled to:
        receive a negative acknowledgement (NACK) in response to transmission of BGP (Border Gateway Protocol) data originally transmitted to a first host of a plurality of network hosts, the NACK identifiable as having been transmitted by a network element having a same address as the first host; and
        responsively transmit data that was to be transmitted to the first host to another of the plurality of network hosts.

* * * * *